(12) United States Patent
Yoshida et al.

(10) Patent No.: US 7,941,601 B2
(45) Date of Patent: May 10, 2011

(54) STORAGE DEVICE USING NONVOLATILE CACHE MEMORY AND CONTROL METHOD THEREOF

(75) Inventors: Kenji Yoshida, Akishima (JP); Yoriharu Takai, Kodaira (JP)

(73) Assignee: Kabushiki Kaisha Toshiba, Tokyo (JP)

(*) Notice: Subject to any disclaimer, the term of this patent is extended or adjusted under 35 U.S.C. 154(b) by 632 days.

(21) Appl. No.: 11/641,825

(22) Filed: Dec. 20, 2006

(65) Prior Publication Data

US 2007/0168608 A1 Jul. 19, 2007

(30) Foreign Application Priority Data

Jan. 17, 2006 (JP) .................................. 2006-009042

(51) Int. Cl.
*G06F 12/00* (2006.01)
(52) U.S. Cl. ................. 711/113; 711/E12.052
(58) Field of Classification Search .................... 711/113
See application file for complete search history.

(56) References Cited

U.S. PATENT DOCUMENTS

| | | | | |
|---|---|---|---|---|
| 6,295,577 | B1* | 9/2001 | Anderson et al. | 711/113 |
| 6,343,343 | B1* | 1/2002 | Menon et al. | 711/114 |
| 6,766,465 | B2* | 7/2004 | Harada | 714/2 |
| 6,925,526 | B2 | 8/2005 | Hall | |
| 7,426,609 | B2* | 9/2008 | Ishii et al. | 711/112 |
| 2004/0068612 | A1 | 4/2004 | Stolowitz | |
| 2005/0125600 | A1 | 6/2005 | Ehrlich | |
| 2005/0210214 | A1* | 9/2005 | Takase et al. | 711/165 |

FOREIGN PATENT DOCUMENTS

| | | |
|---|---|---|
| CN | 1568461 A | 1/2005 |
| JP | 9-146710 | 6/1997 |
| JP | 10-154101 | 6/1998 |
| JP | 10-320128 | 12/1998 |
| JP | 2000-305860 | 11/2000 |
| JP | 2001-175419 | 6/2001 |
| JP | 3407317 | 3/2003 |
| JP | 2003-167781 | 6/2003 |
| JP | 2004-55102 | 2/2004 |

OTHER PUBLICATIONS

Smith, Alan Jay, "Disk Cache—Miss Ratio Analysis and Design Considerations," ACM Transactions on Computer Systems, vol. 3, No. 3, Aug. 1985, pp. 161, 162, and 180.
Chinese Office Action mailed Apr. 11, 2008 for Chinese Application No. 200610171116.7.
Notice of Reasons for Rejection, mailed Oct. 5, 2010, in corresponding Japanese Patent Application No. 2006-009042, and English-language translation thereof.

* cited by examiner

*Primary Examiner* — Reginald G Bragdon
*Assistant Examiner* — Hamdy S Ahmed
(74) *Attorney, Agent, or Firm* — Finnegan, Henderson, Farabow, Garrett & Dunner, L.L.P.

(57) ABSTRACT

A data process can be performed without lowering the data processing efficiency even when the sector length of the host device side is different from the sector length of the hard disk side. Partial data or whole data of a second data block which is based on a long sector defined on the hard disk side and surrounds the starting end and terminating end addresses of a first data block based on a host-defined sector is read from the hard disk and written to a flash memory before the data process using the flash memory as a cache is performed based on the command.

10 Claims, 8 Drawing Sheets

STORAGE DEVICE USING NONVOLATILE CACHE MEMORY AND CONTROL METHOD THEREOF

CROSS-REFERENCE TO RELATED APPLICATIONS

This application is based upon and claims the benefit of priority from Japanese Patent Application No. 2006-009042, filed Jan. 17, 2006, the entire contents of which are incorporated herein by reference.

BACKGROUND

1. Field

One embodiment of the invention relates to a storage device using a nonvolatile cache memory which is designed to realize low power consumption and high-speed read/write operation and attain a long service life of a storage medium and a control method thereof.

2. Description of the Related Art

In recent years, a storage device on which both of a memory card which is a semiconductor storage medium and a hard disk (HD) drive using a hard disk which is a magnetic storage medium can be mounted is developed (refer to Jpn. Pat. Appln. KOKAI Publication No. 2004-055102). For example, data of the memory card fetched from the exterior can be backed up into the hard disk (HD) which is a magnetic storage medium. Further, data of a hard disk (HD) can be transferred to the memory card and can be thus taken out.

As a mobile storage device, a storage device using a flash memory is developed (refer to Japanese Patent Publication No. 3407317). A large number of errors occur in the flash memory when the number of erase operations of the flash memory becomes large (for example, 100,000 times), and therefore, an attempt is made to solve the above problem. For example, a data management method for suppressing the number of erase operations for a specified area from becoming larger is provided.

BRIEF SUMMARY OF THE INVENTION

An object of the embodiments of the present invention is to provide a storage device using a nonvolatile cache memory to create an environment in which the low power consumption and high-speed read/write operation can be realized and the data processing efficiency can be enhanced by effectively utilizing the features of the semiconductor memory and hard disk used as the storage media and a control method thereof. Particularly, an object of the present embodiment is to provide a storage device using a nonvolatile cache memory which can enhance the data processing efficiency even when host-defined sector length defined on the host device side and long sector length defined on the hard disk (magnetic recording medium) side are different and a control method thereof.

According to one aspect of the present invention, there is provided a storage device comprising a host interface with respect to which a command and first data block from a host device dealing with first length as a read/write unit are input and output, a command analyzing section which analyzes the contents of the command, a memory interface for a nonvolatile cache memory, a disk interface which inputs and outputs a second data block with respect to a hard disk dealing with second length as a read/write unit, and a read/write processing section which reads out one of whole data and partial data of the second data block having starting end and terminating end addresses which surround starting end and terminating end addresses of the first data block and lie closest to the above starting end and terminating end addresses from the hard disk and writes the read data to the nonvolatile cache memory before a data process using the nonvolatile cache memory is performed based on the command.

Additional objects and advantages of the embodiments will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings.

<Whole Configuration and Function>

Figure 1:
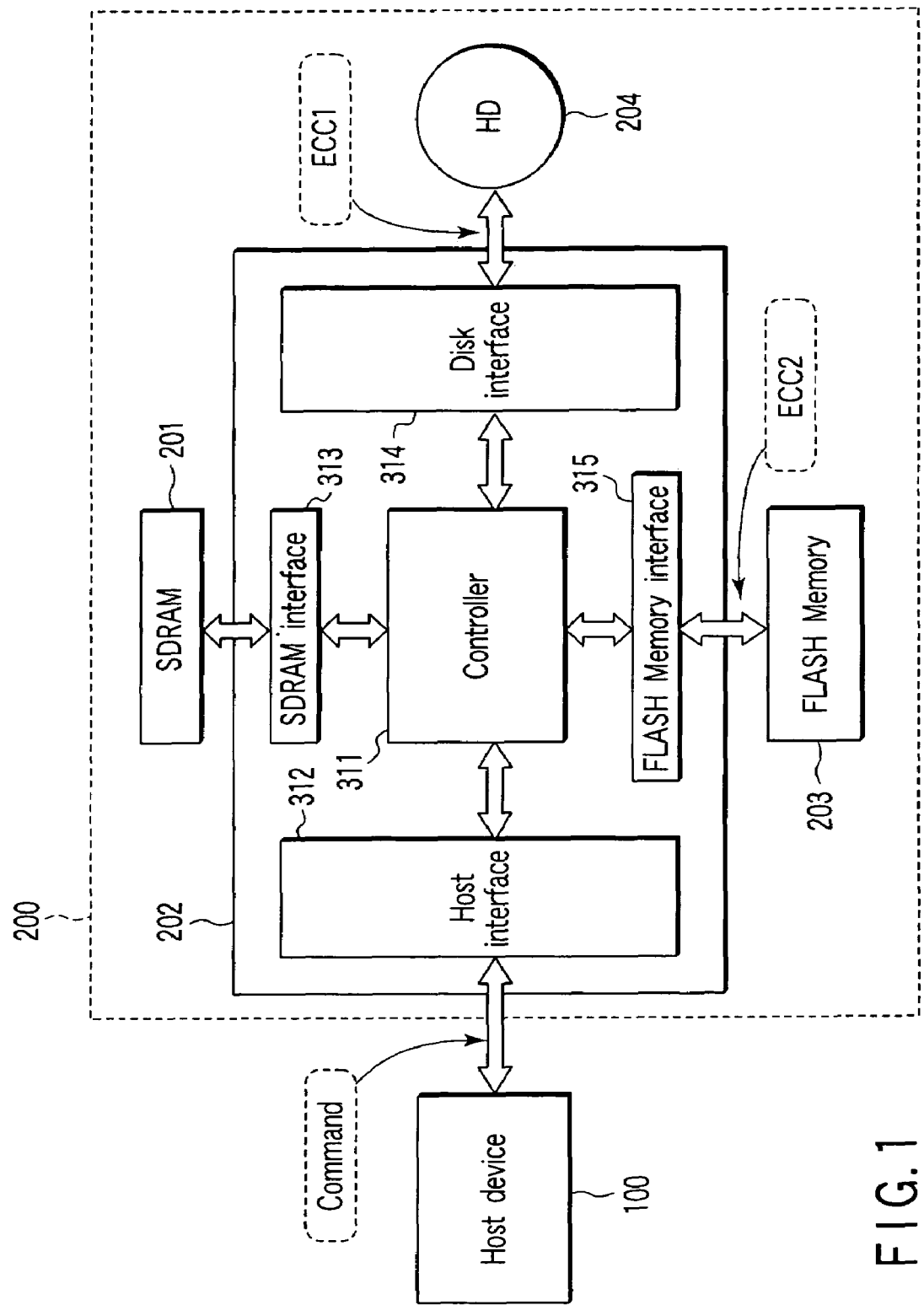
FIG. 1 is an exemplary block diagram showing the whole configuration of one embodiment according to this invention.

First, one example of a whole block of one embodiment is explained with reference to FIG. 1. A reference symbol 100 denotes a host device which is a control section in a personal computer, for example. A reference symbol 200 denotes a storage device using a nonvolatile cache memory. The storage device 200 includes an SDRAM 201 functioning as a buffer, for example, one-chip large-scale integrated circuit (LSI) 202 on which a controller and the like which will be described later are mounted, flash memory 203, and hard disk (HD) 204. The flash memory 203 may be referred to as a nonvolatile cache memory.

The LSI 202 includes a controller 311, host interface 312, SDRAM interface 313, disk interface 314 and flash memory interface 315. The SDRAM 201 may be contained in the LSI 202.

The host device 100 can supply a command to the controller 311 via the host interface 312. Further, the host device 100 can receive data from the controller 311 via the host interface 312 and transfer data to the controller 311 side.

Commands used by the host device 100 and controller 311 contain a data write command, data read command, data size specifying command, data transferring command, data storing command and a command for reading out information from a memory. The controller 311 interprets the command from the host device 100 and performs the data write process, read process and transfer process.

The controller 311 can transfer data with respect to the SDRAM 201 via the SDRAM interface 313. Further, the controller 311 can transfer data with respect to the hard disk (HD) 204 via the disk interface 314. In addition, the controller 311 can transfer data with respect to the flash memory 203 via the flash memory interface 315. Data to be stored in the flash memory 203 is stored after an error correction code is added thereto. Data to be stored in the hard disk is stored after an error correction code is added thereto. An error correction code (ECC) process is performed with respect to recording data into the flash memory and recording data into the hard disk so that an error correcting process can be performed at the reproduction time.

The above apparatus uses portions of the flash memory interface 315 and flash memory 203 as a cache. In this case, the ECC process having higher error correction ability with respect to recording data into the hard disk rather than recording data into the flash memory can be performed.

The data writing sequence and data reading sequence are determined according to software stored in the controller 311. For example, when write data is transferred from the host device 100 to the hard disk 204, the data may be transferred via a path of host interface 202→controller 311→SDRAM interface 313→SDRAM 201→SDRAM interface 313→controller 311→disk interface 314→hard disk 204 or a path of host interface 202→controller 311→flash memory interface 315→flash memory 203→flash memory interface 315→controller 311→disk interface 314→hard disk 204. Further, the data can be transferred via a path of host interface 202→controller 311→flash memory interface 315→flash memory 203→flash memory interface 315→controller 311→SDRAM interface 313→SDRAM 201→SDRAM interface 313→controller 311→disk interface 314→hard disk 204.

When data is read from the hard disk 204 to the host device 100, the data may be read via a path of disk interface 314→controller 311→SDRAM interface 313→SDRAM 201→SDRAM interface 313→controller 311→host interface 312→host device or a path of disk interface 314→controller 311→flash memory interface 315→flash memory 203→flash memory interface 315→controller 311→host interface 312→host device. Further, the data can be read via a path of disk interface 314→controller 311→flash memory interface 315→flash memory 203→flash memory interface 315→controller 311→SDRAM interface 313→SDRAM 201→SDRAM interface 313→controller 311→host interface 312→host device.

Further, the data can be read via corresponding interfaces and a path of disk→SDRAM→flash memory→host device or a path of disk→SDRAM→flash memory→SDRAM→host device.

<Explanation for Flash Memory>

Figure 2:
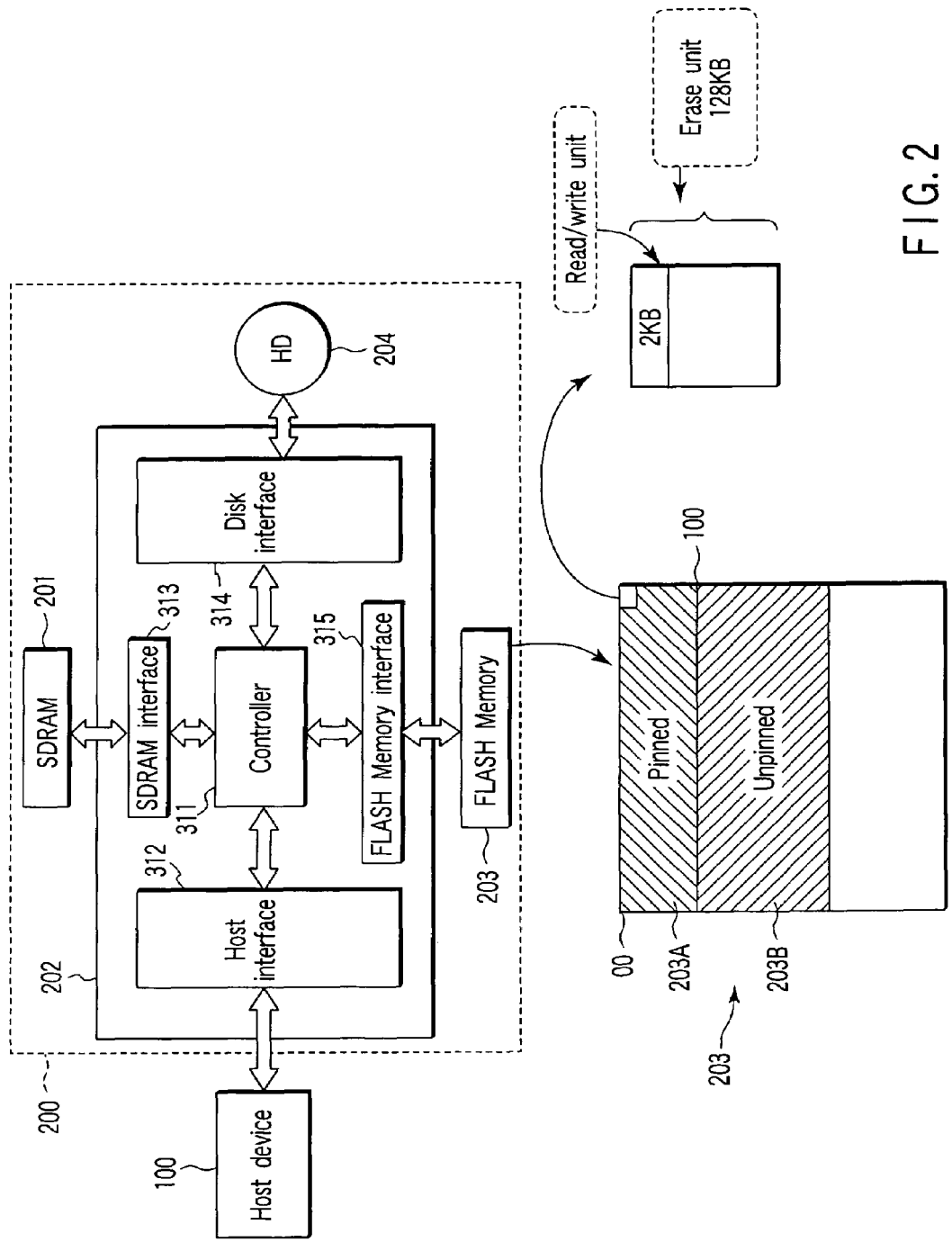
FIG. 2 is a diagram for illustrating the feature of a flash memory shown in FIG. 1.

FIG. 2 is a diagram for illustrating the peculiar control operation in dealing with the flash memory 203. The flash memory 203 is a nonvolatile memory, but data can be electrically erased. Therefore, it is a data rewritable nonvolatile memory.

For example, the erase unit of the flash memory 203 is specified by 128 Kbytes. Further, the reading unit and writing unit are specified by 2 Kbytes, for example. The elements of the flash memory 203 are deteriorated and the number of errors increases with an increase in the number of erasing operations. Therefore, as information which ensures the performance of the element, the number of rewriting times is limited to approximately 100,000 times. The number of bytes of the erase unit and the number of bytes of the writing unit are not limited to the above values. For example, the erase unit may be set to 23 Kbytes and the reading/writing unit may be set to 512 bytes.

<Basic Relation between Flash Memory, Controller and Command from Host Device>

As shown in FIG. 2, when data is written to the flash memory 203, the write area can be divided into areas which are called a pinned area 203A and unpinned area 203B. The pinned area 203A is an area which is formed when a data write destination-indicating command supplied from the host device 100 specifies the flash memory 203. The command contains a block address (LBA) of the flash memory 203, and a data write destination-identification data for the flash memory 203. The unpinned area 203B is an area which is formed when a data write destination-indicating command from the host device 100 is not specified and in which data transferred according to independent determination by the controller 311 is stored.

As data written to the flash memory 203, data supplied from the host device 100 or data read out from the hard disk 204 is provided.

Various types of determination conditions for determining a data write destination by the controller 311 are provided. The state determining section of the controller 311 synthetically judges the conditions of the surroundings and determines the write destination. For example, the condition occurs immediately after the power supply of the device is turned on and when the hard disk 204 does not reach a preset rotation speed or when the hard disk 204 is set in the stop state.

<Function and Configuration of Flash Memory Interface 315 and Controller 311>

Figure 3:
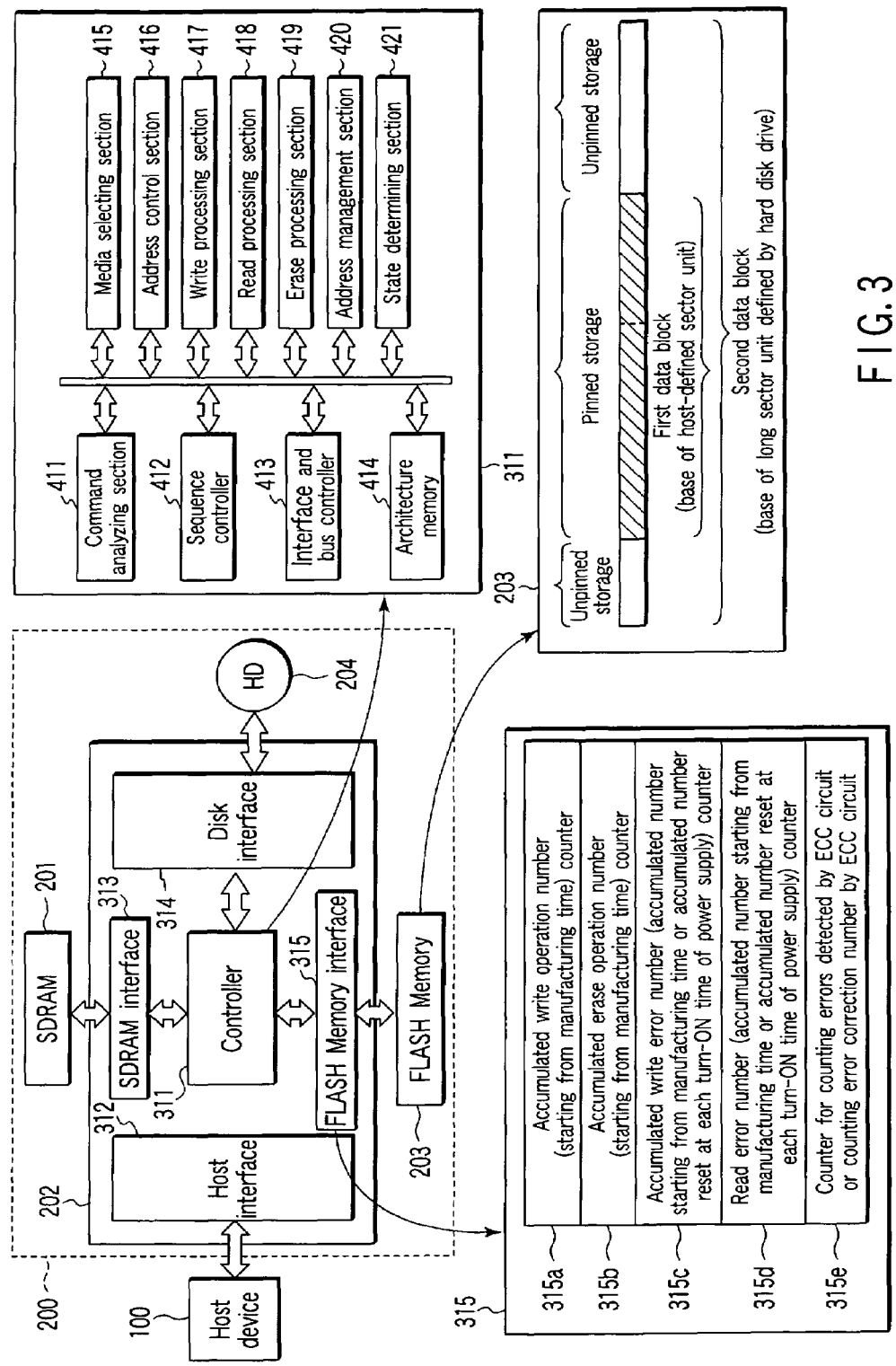
FIG. 3 is a diagram for illustrating the functions of a flash memory interface and controller 311 shown in FIG. 1.

FIG. 3 shows the configurations of the controller 311 and flash memory interface 315 classified according to respective functions. An accumulation counter is provided in the flash memory interface 315, the count value thereof is written to a register provided in the interface, for example, and then written to the flash memory 203 or the flash memory 203 may be directly utilized.

As the counter, an accumulated write operation number counter 315a, accumulated erase operation number counter 315b, accumulated write error number counter 315c and read error number counter 315d are provided. Instead of the read error number counter 315d, an error number counter for counting errors detected by an ECC circuit or an error correction number counter 315e can be provided. Further, a counter which counts the reading/writing unit can be provided. The contents of the counters are used as the determination factors of the state determining section which determines whether warning is issued when the number of errors becomes larger.

The controller 311 includes a command analyzing section 411 to decode and analyze a command supplied from the host device 100. It specifies software in an architecture memory 414 based on the analysis result of the command and sets an operation sequence in a sequence controller 412. Further, the command analyzing and control operation can be performed in the interface 312.

The sequence controller 412 controls the flow of data and control data via an interface and bus controller 413. For example, when the data write or read operation is performed, a media selecting section 415 specifies a flash memory 203 or hard disk (HD) 204 and an address control section 416 specifies a write address or read address. Then, at the data write time, a write processing section 417 performs a write data transfer process or the like. Further, at the data read time, a read processing section 418 performs a read data transfer process or the like.

In addition, an erase processing section 419 is provided. The erase processing section 419 performs the erase process for data of the flash memory 203. Further, the erase processing section 419 can perform the erase process for data of the hard disk 204.

An address management section 420 is provided. The address management section 420 collectively manages addresses of the hard disk 204 and addresses of the recorded area and unrecorded area of the flash memory 203. Since the flash memory 203 is used as a cache memory, it is not necessary to pay attention to the address of the cache memory and set the address of the hard disk 204 side when the host device 100 side specifies the address. When a cache memory is particularly specified as a data storage destination, a pinned command may be issued. If a pinned command is not provided, the data storage destination depends on the determination result of the firmware configured in the controller 311.

The address management and control operation for the pinned area and unpinned area of the flash memory 203 may be performed in the flash memory interface 315.

Further, a state determining section 421 is provided. The state determining section 421 monitors the state of the hard disk 204.

When the storage capacity of the flash memory 203 becomes larger than a certain threshold value, the controller 311 determines the state and performs a process of transferring and writing data into the hard disk 204. The operation performed at this time is mainly controlled by a combination of the read processing section 418, write processing section 416 and address management section 420.

Peculiar Configuration, Function And Operation in Present Embodiment

<Preposition> It is preferable to use the above storage device with low power consumption. In order to attain this, the operation may preferably be managed to set the number of driving operations of the hard disk 204 as small as possible. If the management operation is performed to serve the above purpose, the number of accesses to the flash memory 203 will increase. Further, if the management operation is performed to increase the number of write operations with respect to the flash memory 203, then there occurs a new problem that the service life of the flash memory 203 is shortened.

<Solving Measure> Therefore, in the present embodiment, the operation management is performed to suppress the service life of the flash memory 203 from being shortened while an attempt is made to lower the power consumption.

Figure 4:
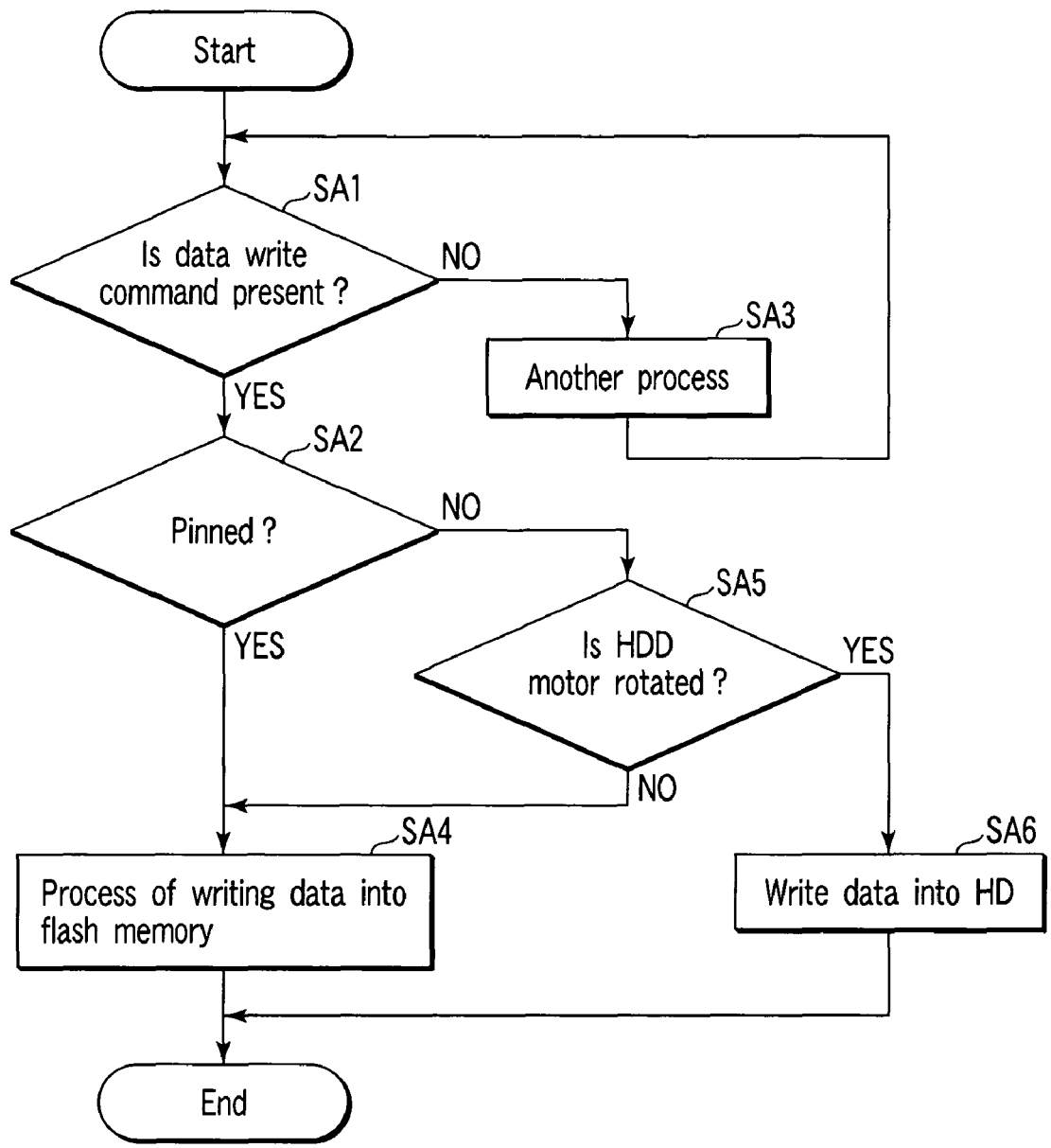
FIG. 4 is a flowchart for illustrating one example of the operation of a device shown in FIG. 1.

FIG. 4 is one example of a flowchart for illustrating the operation when the device performs the data writing process. The command analyzing section 411 analyzes a command supplied from the host device 100 and determines whether a data write command is provided or not (step SA1). If no data write command is provided, another process is performed (step SA3) and the process returns to step SA1.

If a data write command is provided, whether write data is pinned data or not is determined (step SA2). If it is the pinned data, the write processing section 418 writes data to the flash memory 203. If the write data is not pinned data, whether the HDD motor (spindle motor) is rotated or not is determined by the state determining section 421 (step SA5). When the spindle motor is not rotated, the write processing section 418 writes write data (corresponding to an unpinned area) to the flash memory. When the hard disk drive (HDD) motor is rotated, the write processing section 418 writes write data to the hard disk 204. As the determining condition for permitting data to be written to the hard disk 204, whether the service life of the flash memory 203 comes close to the end or not is determined and if the service life comes close to the end, data may be written to the hard disk 204.

<Effective Influence>

By performing the above management operation, the number of new drive operations of the hard disk 204 can be set as small as possible. Therefore, the power consumption can be lowered. Further, the number of accesses to the flash memory 203 can be suppressed. As a result, the service life of the flash memory 203 can be made longer.

Peculiar Environment Coped with in Present Embodiment

Figure 5:
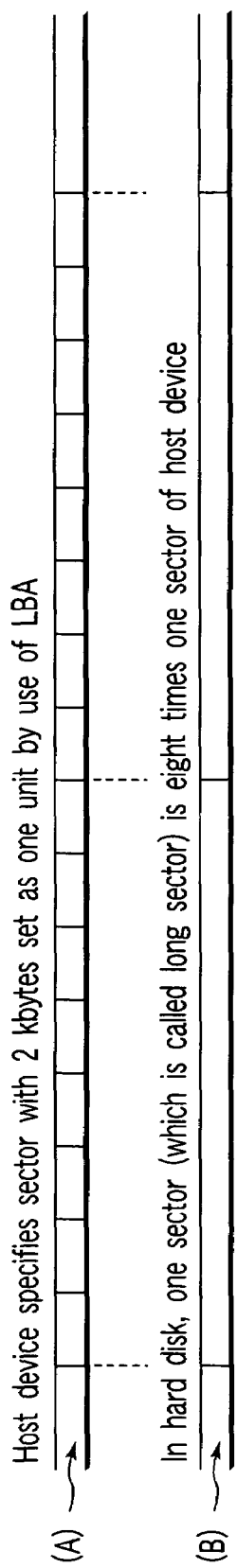
FIG. 5 is a diagram showing a host-defined sector unit dealt with by a host device and a long sector unit dealt with by a hard disk.

FIG. 5 shows a comparison of sectors with different sizes. A sector string (A) managed by the host device 100 and a sector string (B) managed by the hard disk 204 are compared with each other. In the host device 100, 512 bytes are managed as one sector. On the other hand, in the hard disk 204, the length of a constant multiple of the length of one sector in the host device 100, for example, eight times the length of the sector is dealt with as the length of one sector (which is called a long sector). The reason why the long sector is used is that the capacity of an error correction code (ECC) which is a redundancy portion can be reduced as a whole in comparison with a sector used in the host device 100. A lowering in the capacity of the ECC leads to enhancement of the efficiency of use of the data area.

<Read Processing Section>

Figure 6:
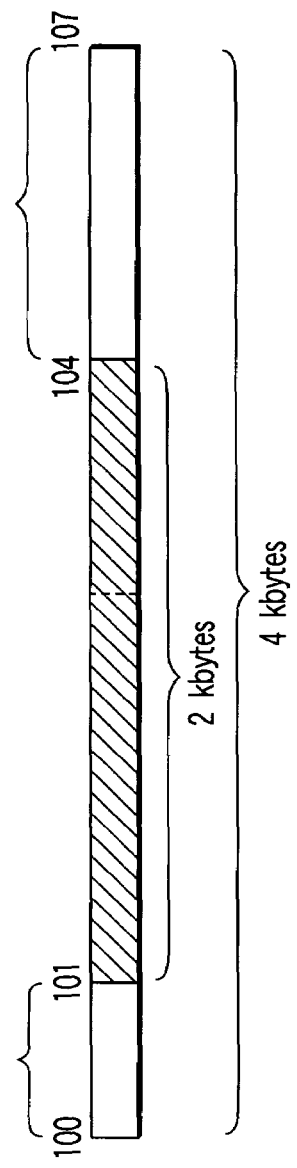
FIG. 6 is a diagram showing the relation between the host-defined sector and long sector.

Next, the explanation is made with reference to FIG. 6. It is now assumed that a command (1) to write data to the pinned area or (2) to secure the pinned area (in this case, no data is provided) is issued from the host device 100. Further, it is assumed that addresses "101" to "104" are specified as a logical block address (LBA) used as a target at this time.

Then, the pinned area indicated by oblique lines in FIG. 6 is secured in the flash memory 203. After this, the process is performed for data in the pinned area. Next, for example, when the area of the flash memory becomes full, or when an instruction of storage is provided on the system, it is necessary to write data with addresses "101" to "104" to the hard disk 204.

At this time, the access unit of the hard disk 204 is the long sector unit and, in this case, data of a data block (corresponding to a long sector) with addresses "100" to "107" is used as write data. In the device, data of a long sector containing address "100" and addresses "105" to "107" is previously read from the hard disk 204 and then the unpinned area is processed. That is, data of address "100" and addresses "105" to "107" is connected to data in the pinned area and then stored into the flash memory 203.

In the above explanation, addresses "101" to "104" in the access unit specified by the host device 100 are contained in addresses "100" to "107" in the access unit of the hard disk 204. The correspondence relation between the addresses can be acquired by referring to a table of the address management section 420. The area of address "101" to address "104" of the flash memory 203 is managed as the pinned area and the area of address "100" and the area of address "105" to "107" are managed as the unpinned area. The management operation may be performed by use of the address management section 420 or a management section may be provided in the flash memory interface 315.

At this time, if the process for original data in the pinned area is terminated, data is stored in the hard disk 204. In this case, it is not necessary to instantly store data of the pinned area and unpinned area into the hard disk 204. For example, if the storage capacity of the flash memory 203 exceeds a threshold value or if it becomes necessary to store data on the system and a storage command is issued, the storage process is performed. When the storage process is performed, the process is performed in the long sector unit in an area containing the pinned area and unpinned area.

In such a case, in the present embodiment, since data of the long sector unit of the hard disk 204 is previously cached, data can be processed in the access unit of the hard disk 204. As a result, the data processing efficiency is enhanced. That is, when the process for data of the pinned area is terminated and data is stored in the hard disk 204, data of one sector (addresses "100" to "107") of the hard disk 204 is purposely read once and combined with data for which the process is terminated and it becomes unnecessary to next store data into the hard disk 204.

The above explanation is made by taking a case wherein a command to write data to the pinned area is issued as an example. The operation performed when another command is issued is explained.

It is now assumed that the host device 100 reads out data with addresses "101" to "104" of the hard disk 204 and issues a command to cache the read data into the flash memory 203 as pinned data. In the command, logical block addresses (LBA) ("101", . . . "104") of four sectors, for example, are contained.

One sector which corresponds to addresses "101" to "104" and is used as an access unit of the hard disk 204 is managed by addresses "100" to "107". The correspondence relation can be acquired by referring to the table of the address management section 420. In such a case, in the present embodiment, one sector (addresses "100" to "107") of the hard disk 204 is read and stored in addresses "100" to "107" of the flash memory 203. At this time, the area of address "101" to address "104" is managed as the pinned area and the area of address "100" and the area of address "105" to address "107" are managed as the unpinned area. The management operation may be performed by use of the address management section 420 or a management section may be provided in the flash memory interface 315.

At this time, if the process for original data in the pinned area is terminated, data is stored in the hard disk 204. In this case, in the present embodiment, since data of the sector unit of the hard disk 204 is previously cached, data can be processed in the access unit of the hard disk 204. As a result, the data processing efficiency is enhanced. That is, when the process for data of the pinned area is terminated and data is stored in the hard disk 204, data of one sector (addresses "100" to "107") of the hard disk 204 is purposely read once and combined with data for which the process is terminated and it becomes unnecessary to next store data into the hard disk 204.

Figure 7A:
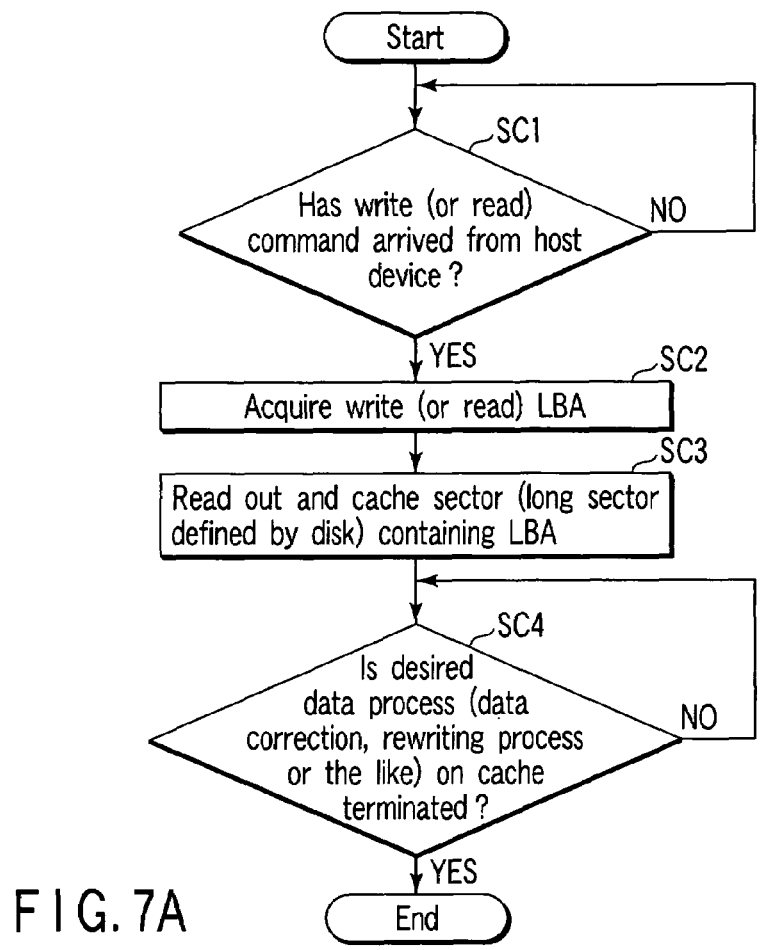
FIGS. 7A and 7B are flowcharts for illustrating one example of the operation performed by the device shown in FIG. 3.

FIG. 7A is a flowchart for illustrating one example of the above operation. It is assumed that a write command arrives from the host device 100 (step SC1). The logical block address (LBA) to be written is acquired (step SC2). A long sector containing the LBA and defined by the hard disk 204 is read and cached into the flash memory 203.

After this, the desired data process on the cache is terminated (step SC4) and the internal process for the write command is terminated.

Figure 7B:
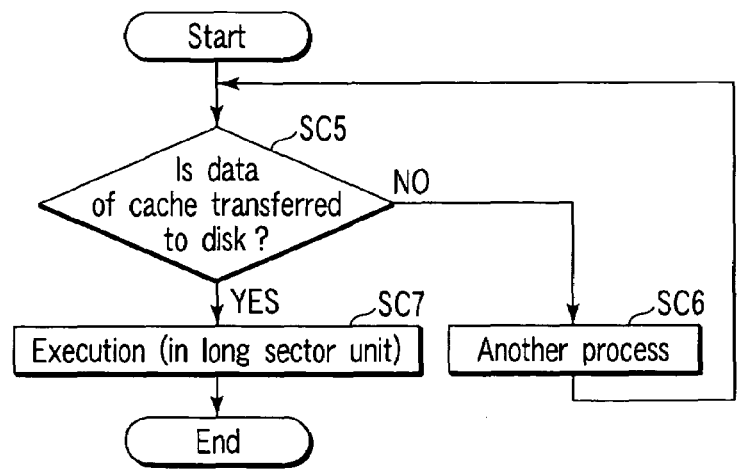

Then, when storage of data becomes necessary (for example, when the capacity of the flash memory exceeds a preset value, a storage command is issued on the system or a storage command has already been issued), the process proceeds to step SC5 (FIG. 7B). In this case, the process is performed in the access unit (long sector unit) of the hard disk 204 (step SC7).

Figure 8:
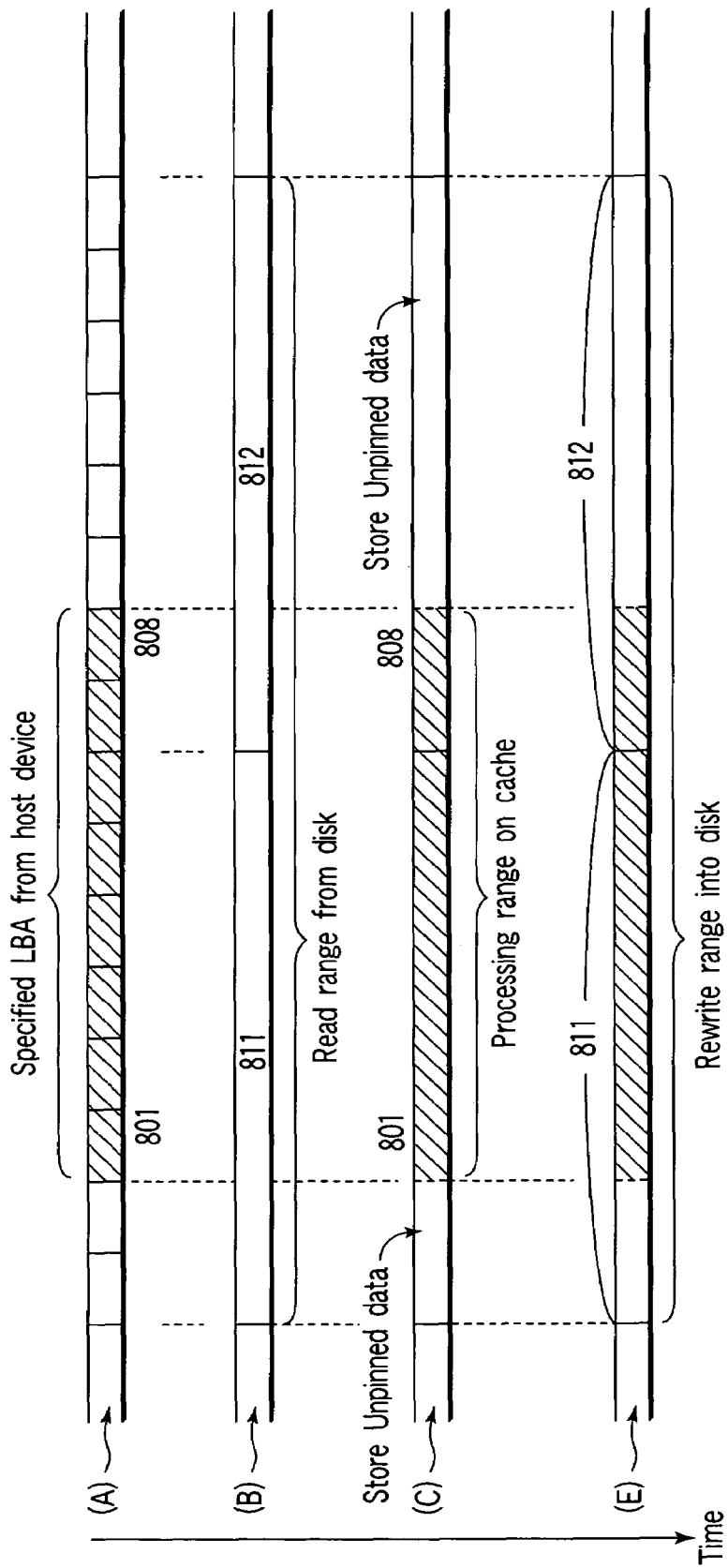
FIG. 8 is a diagram showing data processed in the flowcharts of FIGS. 7A and 7B as an image on the cache memory.

FIG. 8 shows the above operation as a data processing image on the cache memory together with time passage. It is assumed that the host device 100 issues a command to write and cache data of the logical block address of host-defined sectors 801 to 808 into the flash memory 203 or secure an address ((A) of FIG. 8). Further, it is assumed that the logical address is contained in the long sectors 811, 812 on the hard disk 204. Then, whole data of the sectors 811, 812 is read and cached ((B) of FIG. 8). In the cache memory or flash memory 203, the process (rewriting or correcting process) of data of the host-defined sectors 801 to 808 is performed ((C) of FIG. 8).

When the process on the cache memory is terminated and storage of data into the hard disk 204 becomes necessary on some conditions data is transferred to and written to the hard disk 204 in the unit of the long sectors 811, 812 as shown in (E) of FIG. 8.

Figure 9:
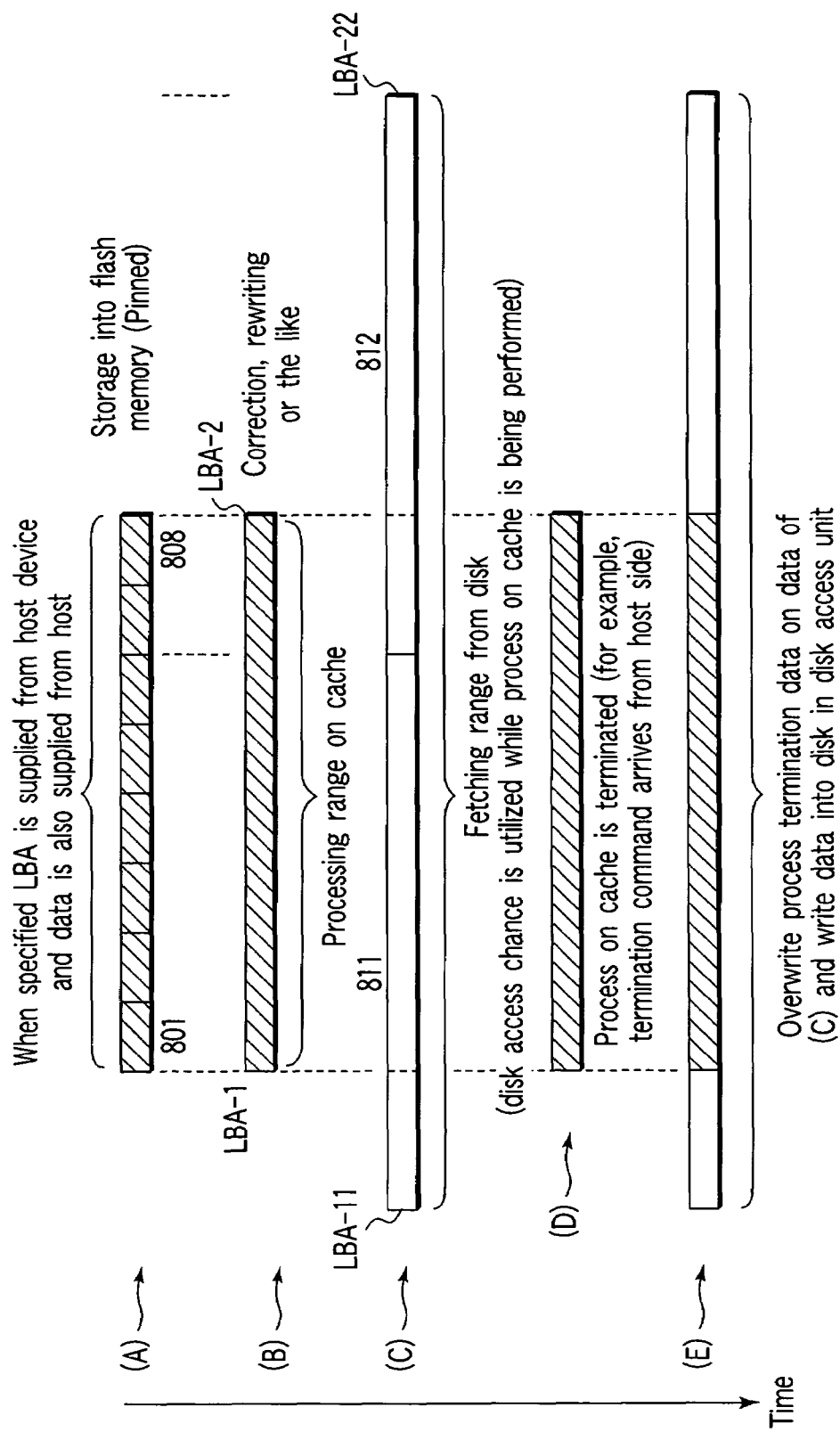
FIG. 9 is a diagram showing data processed in an embodiment other than the embodiment of FIG. 8 as an image on the cache memory.

FIG. 9 shows a case wherein data from the host device 100 is transferred to the cache memory (flash memory 203) as pinned data.

It is supposed that the logical block address of a write destination covers the host-defined sectors 801 to 808 (indicating the starting end and terminating end addresses) ((A) of FIG. 9). To-be-processed data (to be written or corrected) on the cache becomes data of the host-defined sectors 801 to 808.

There is a possibility that the data is stored in the hard disk 204 after the process is terminated. However, if the data is kept unchanged, the host-defined sector unit is different from the access unit (long sector unit) for the hard disk 204. The logical block address of the host-defined sectors 801 to 808 is contained in the long sectors 811, 812 as shown in (C) of FIG. 9. In other words, the starting end and terminating end addresses LBA1 and LBA2 of the first data block by the host-defined sectors 801 to 808 are surrounded (or included) by the starting end and terminating end addresses LBA11 and LBA22 of the second data block by the long sectors 811, 812. Further, the starting end and terminating end addresses LBA11 and LBA22 are addresses lying closest to the starting end and terminating end addresses LBA1 and LBA2 of the first data block. This can be attained by referring to the address management table of the address management section 420.

Therefore, in the present embodiment, as shown in (C) of FIG. 9, the long sectors 811, 812 are read from the disk and temporarily stored in the buffer area of the flash memory 203 or SDRAM while data of the host-defined sectors 801 to 808 is being processed as shown in (B) of FIG. 9.

The data read timing is timing at which the hard disk 204 is accessed and is preferably set to timing at which an area lying close to the long sectors 811, 812 is accessed. The timing at which the hard disk 204 is accessed is timing at which data is saved, for example. Further, as the above timing, timing at which data of a different file is read for a window process is provided, for example.

Next, as shown in (D) of FIG. 9, it is assumed that the process for data of the host-defined sectors 801 to 808 is completed and a command to store the data into the hard disk 204 is input from the host device 100. Then, data of the host-defined sectors 801 to 808 which has already been processed is written over data of the sectors 811, 812 which has previously been read as shown in (E) of FIG. 9 and recorded on the hard disk 204 in the long sector unit.

Alternatively, instead of the above processing method, a method of storing data of a portion obtained by eliminating the area of the first data block from the second data block into the cache memory (flash memory) as unpinned data when data of (C) of FIG. 9 is read from the hard disk 204 can be used. With this method, since the state shown in (E) of FIG. 9 is already structured in the flash memory 203 when the process for the first data block is completed, data can be stored in the hard disk 204 without performing the overwriting process described before.

As described above, according to the present embodiment of this invention, the storage device includes the host interface 312 with respect to which a first data block and command from the host device 100 are input/output with the first length used as the read/write unit, the command analyzing section 411 which analyzes the contents of the command, the flash memory interface 315 for the flash memory 203, and the disk interface 314 which permits a second data block to be input/output with respect to the hard disk 204 with the second length used as the read/write unit. Then, the read processing section 418 and write processing section 416 read partial data or whole data of the second data block having the starting end and terminating end addresses which surround the starting end and terminating end addresses of the first data block and lie closest to the starting end and terminating end addresses from the hard disk 204 and write the read data to the flash memory 203 before the data process using the flash memory 203 is performed based on the command. The read/write unit of the first length is the host-defined sector unit used in the host device 100 and the read/write unit of the second length is the long sector unit used in the hard disk 204.

As described above, since data items in the read/write units of different lengths (different sector lengths) are processed, data of part of the area of the second data block read from the hard disk 204 is processed in the data process using the flash memory 203 as shown in FIG. 8.

As is explained with reference to FIGS. 8, 9, the read/write processing sections 418, 417 perform the process of reading out data of a portion obtained by eliminating the first data block from the second data block or data of the whole portion of the second data block from the hard disk 204 and writing the read data into the flash memory 203.

As described above, according to the present embodiment, it is possible to provide a storage device using a nonvolatile cache memory which can enhance the data processing efficiency even when the sector length defined on the host device side is different from the sector length defined on the hard disk (magnetic recording medium) side and a control method thereof.

In the invention described above, the low power consumption and high-speed read/write operation can be realized and the data processing efficiency can be enhanced even when the host-defined sector length defined on the host device side is different from the sector length defined on the hard disk (magnetic recording medium) side.

While certain embodiments of the inventions have been described, these embodiments have been presented by way of example only, and are not intended to limit the scope of the inventions. Indeed, the novel methods and systems described herein may be embodied in a variety of other forms; furthermore, various omissions, substitutions, and changes in the form of the methods and systems described herein may be made without departing from the spirit of the inventions. The accompanying claims and their equivalents are intended to cover such forms or modifications as would fall within the scope and spirit of the inventions.

What is claimed is:

1. A storage device using a nonvolatile cache memory, comprising:
    a host interface for receiving a write command including a destination and a first data block from a host device dealing with a first length as a read/write unit,
    a memory interface for a nonvolatile cache memory,
    a disk interface for a hard disk dealing with a second length as a read/write unit, and
    a controller for:
        determining whether the destination specifies the nonvolatile cache memory;
        determining whether a spindle motor of the hard disk is rotating;
        upon determining that the destination specifies the nonvolatile cache memory, writing the first data block to the nonvolatile cache memory;
        upon determining that the destination does not specify the nonvolatile cache memory and that the spindle motor is not rotating, writing the first data block to the nonvolatile cache memory; and
        upon determining that the destination does not specify the nonvolatile cache memory and that the spindle motor is rotating:
            reading out one of partial data and whole data of a second data block having starting end and terminating end addresses which surround and lie closest to starting end and terminating end addresses of the first data block from the hard disk;
            writing the second data block including the first data block from the hard disk to the nonvolatile cache memory;
            performing a data process on the first data block in the nonvolatile cache memory based on the write command; and
            writing the second data block including the first data block from the nonvolatile cache memory to the hard disk.

2. The storage device using the nonvolatile cache memory according to claim 1, wherein the read/write unit of the first length is a host-defined sector unit used in the host device and the read/write unit of the second length is a long sector unit used in the hard disk.

3. The storage device using the nonvolatile cache memory according to claim 1, wherein the read/write unit of the first length is a host-defined sector unit used in the host device, the read/write unit of the second length is a long sector unit used in the hard disk and length of a long sector is a constant multiple of the length of the host-defined sector.

4. The storage device using the nonvolatile cache memory according to claim 1, wherein data in part of an area of the second data block read from the hard disk is processed in a data process using the nonvolatile cache memory.

5. The storage device using the nonvolatile cache memory according to claim 1, wherein the read/write processing section reads out one of data in a portion obtained by eliminating the first data block from the second data block and whole data of the second data block from the hard disk and writes the read data to the nonvolatile cache memory.

6. A storage device control method, comprising:
    receiving a write command including a destination and a first data block from a host device dealing with a first length as a read/write unit;
    determining whether the destination specifies a nonvolatile cache memory;

upon determining that the destination specifies the nonvolatile cache memory, writing the first data block to the nonvolatile cache memory;

upon determining that the destination does not specify the nonvolatile cache memory:

determining whether a spindle motor of a hard disk dealing with a second length as a read/write unit is rotating;

upon determining that the spindle motor is not rotating, writing the first data block to the nonvolatile cache memory;

upon determining that the spindle motor is rotating:

reading out one of partial data and whole data of a second data block having starting end and terminating end addresses which surround and lie closest to starting end and terminating end addresses of the first data block from the hard disk;

writing the second data block including the first data block from the hard disk into the nonvolatile cache memory;

performing a data process on the first data block in the nonvolatile cache memory based on the write command; and writing the second data block including the first data block is from the nonvolatile cache memory to the hard disk.

7. The storage device control method according to claim 6, wherein a host-defined sector unit used in the host device is set as a read/write unit of the first length and a long sector unit used in the hard disk is set as a read/write unit of the second length.

8. The storage device control method according to claim 6, wherein a host-defined sector unit used in the host device is set as a read/write unit of the first length, a long sector unit used in the hard disk is set as a read/write unit of the second length and length of a long sector is a constant multiple of the length of the host-defined sector.

9. The storage device control method according to claim 6, wherein data in part of an area of the second data block read from the hard disk is processed in the data process.

10. The storage device control method according to claim 6, wherein one of data in a portion obtained by eliminating the first data block from the second data block and whole data of the second data block is read from the hard disk and written to the nonvolatile cache memory when data is written from the hard disk into the nonvolatile cache memory.

* * * * *